(12) United States Patent  (10) Patent No.: US 7,770,394 B2
Beck  (45) Date of Patent: Aug. 10, 2010

(54) REMOTE POWER-GENERATING ASSEMBLY

(75) Inventor: Blaine Edwin Beck, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 95 days.

(21) Appl. No.: 11/956,119

(22) Filed: Dec. 13, 2007

(65) Prior Publication Data

US 2009/0152868 A1 Jun. 18, 2009

(51) Int. Cl.
- F01K 23/06 (2006.01)
- F01K 13/00 (2006.01)
- B63B 35/44 (2006.01)
- F24H 1/00 (2006.01)
- F22B 9/02 (2006.01)
- F02B 63/04 (2006.01)
- F03G 7/08 (2006.01)
- H02K 7/18 (2006.01)

(52) U.S. Cl. .................. 60/670; 60/645; 60/398; 114/264; 122/18.3; 122/114; 290/1 R (58) Field of Classification Search ............ 60/398, 60/641.1, 670, 671, 645, 651, 653; 122/15.1, 122/18.1, 18.3, 31.1, 31.2, 13.01, 16.1, 17.1, 122/17.2, 18.2, 114–133, 155.1–187, 266, 122/271, 272, 463–465, 467, 448.1–448.3, 122/459, 460, 466; 290/1 R; 114/264–267
See application file for complete search history.

(56) References Cited

U.S. PATENT DOCUMENTS

| | | | | |
|---|---|---|---|---|
| 1,952,520 A | * | 3/1934 | Urquhart | 165/286 |
| 2,981,250 A | * | 4/1961 | Stewart | 122/17.2 |
| 3,449,589 A | * | 6/1969 | Majkrzak et al. | 290/2 |
| 3,837,308 A | * | 9/1974 | Harvey et al. | 114/264 |
| 3,915,124 A | * | 10/1975 | Kuhn et al. | 122/115 |
| 3,962,877 A | * | 6/1976 | Schiemichen | 405/203 |
| 4,112,687 A | * | 9/1978 | Dixon | 60/641.6 |
| 4,384,459 A | | 5/1983 | Johnston | |
| 5,022,379 A | * | 6/1991 | Wilson, Jr. | 126/116 R |
| 5,794,446 A | * | 8/1998 | Earley et al. | 60/646 |

(Continued)

FOREIGN PATENT DOCUMENTS

GB 2191229 A 12/1987
GB 2299108 A 3/1996

*Primary Examiner*—Thomas E Denion
*Assistant Examiner*—Christopher Jetton
(74) *Attorney, Agent, or Firm*—Christopher D. Northcutt (57) ABSTRACT

A remote power supply system associated with offshore hydrocarbon production and transportation operations includes an expansion turbine that generates power for the system. The remote power supply system also has a support structure that supports the expansion turbine. A cooling section is supported by the support structure, and is in fluid communication with the expansion turbine to receive the vapor therefrom and to condense it to liquid. A downcomer and boiler section is in fluid communication with the cooling section to receive the liquid condensed from the vapor. An ignition assembly is positioned toward a lower end portion of the downcomer and boiler section. The ignition assembly ignites a fuel and air mixture and causes the liquid received by the downcomer and boiler section from the cooling section to boil into vapor. A return passage conveys vapor from the downcomer and boiler section to the inlet of the expansion turbine.

25 Claims, 8 Drawing Sheets

U.S. PATENT DOCUMENTS 6,672,391 B2 1/2004 Anderson et al.
7,071,579 B2 * 7/2006 Erdman et al. ................ 290/55
2006/0033338 A1 2/2006 Wilson
2006/0243186 A1 11/2006 Park

* cited by examiner

REMOTE POWER-GENERATING ASSEMBLY

BACKGROUND OF THE INVENTION

1. Field of the Invention

This invention relates in general to supplying power to offshore equipment, and in particular to an apparatus and assembly, and methods associated therewith, for supplying power control and communications to offshore equipment associated with hydrocarbon containing reservoirs.

2. Background of the Invention

The offshore industry has a critical need for an independently deployable, highly reliable, highly available, and low maintenance source of power. This source may be used for powering subsurface and surface pumping, compression needs, other associated fluids conditioning facilities, as well as other power consuming devices. Additionally, supplemental power capabilities are often needed at existing offshore facilities where power demands have grown beyond installed capacity.

Many previously discovered offshore hydrocarbon reservoirs contain producible hydrocarbons, but the producible volumes are insufficient to economically justify the deployment of a dedicated host or stand-alone production facility. In instances where stand-alone development can not be justified the reservoir fluids can sometimes be transported through a pipeline or pipelines either to a neighboring facility to share the infrastructure or to shore to reduce costs and improve the reservoir development economics.

In many of these instances, the distance to the neighboring facility or shore, or tie-back distance, can constitute a major inhibitor to exploitation due to insufficient natural reservoir pressure to adequately support free flowing production. Such tie-back distances can be in excess of fifty (50) or one-hundred (100) miles. Additionally, the water depth associated with a particular reservoir can also be a major inhibitor to exploitation. Pumping, compression and heating stations, either at the reservoir location or at intermediate locations along fluid flowlines or pipelines are typically utilized to promote increased reservoir production.

While the industry has been investigating ways to transport hydrocarbons longer distances and lift production from greater water depths, several problems continue to hamper the reliability and feasibility of exploiting the remote reservoirs. Such a problem can be helped by the use of subsea and surface pumps, compressors, heating, produced fluids conditioning and processing, or a combination thereof, but then arises the problem of providing for large power demands at theses extremely remote, deep, or remote and deep locations.

One particularly difficult situation arises when an isolated and/or ultra deepwater offshore hydrocarbon reservoir could be produced through a host facility with local pressure boosting and/or fluids conditioning, but is where the transmission of necessary power is not technically and/or economically feasible, given the current state of the art.

One method of providing such power is through the use of a steam or other fluid-filled, phase-change cycle based system, such as a Rankin cycle. In general, however, this has not been the method of choice in an offshore environment due to the typical system space, weight, costs, and the initial and operating complexities for an efficient phase-change cycle based system. The selection criteria of space, weight, cost, and complexity tend to be better answered offshore with conventional industrial or aero-devivative fuel fired turbine, and/or reciprocating engine drivers.

The pressure difference between the high and low sides of conventional Rankin cycle is a key factor in the overall cycle efficiency. In general, higher pressure differences yield higher fuel efficiencies. However, in a normal system, attaining high pressure differences adds considerably to the space, weight, complexity and cost of the system.

Typical electric generation systems produce fixed frequency (50 or 60 Hz) alternating current. Where driven equipment (e.g. pumps or compressors) is required to compensate for variations in performance demand, variable speed operation is often the desired option. In the case of electric motors as drivers, electronic variable speed motor controllers are often selected. These electronic variable speed controllers are typically large, costly and highly sensitive to their installation environment.

The output of electronic variable speed controllers is pseudo-sinusoidal electrical current, not the pure sinusoidal current as produced directly by an electrical generation facility. Transmitting pseudo-sinusoidal electrical current through power lines results in harmonic feedback system instability and inefficiency that increase with transmission distance. The available technology for large load distribution (especially variable frequency energy as used in variable speed motors) severely limits the maximum technical or economic transmission distance and/or water depth.

Remote and/or unattended power generation schemes including "buoy" supported systems, have been deployed using moderately reliable, maintenance intensive diesel engine driven engines. While the systems are functional, constant operator intervention and maintenance operations have made it difficult to maintain the desired system availability in a primarily unmanned remote offshore environment. Fuel supply logistics and quality are typical problem areas of conventional diesel fueled engines.

Gas turbine technology has also been considered for "buoy" based or remote power generation. However, gas turbines present similar challenges to availability, fuel quality, and frequent visits by maintenance personnel to those encountered with diesel driven systems.

SUMMARY OF THE INVENTION

A remote power supply system associated with offshore hydrocarbon production and transportation operations includes an expansion turbine that generates power for the system. A support structure supports the expansion turbine. A cooling section is supported by the support structure, and is in fluid communication with the expansion turbine to receive the vapor from therefrom. The cooling section condenses to liquid the vapor exiting the expansion turbine. A liquid downcomer and a boiler section is in fluid communication with the cooling section to receive the liquid condensed from the vapor. An ignition assembly is positioned toward a lower end portion of the downcomer and boiler section. The ignition assembly ignites a fuel and air mixture, and causes the liquid received by the downcomer and boiler section from the cooling section to boil into vapor. A return passage that is in fluid communication with an inlet of the turbine conveys vapor from the downcomer and boiler section to the inlet of the expansion turbine.

In the system, the cooling section can be a condenser. The condenser can be submerged below sea level. In the system, the downcomer and boiler section can extend from within the cooling section toward the sea floor. In the system, the expansion turbine can drive an electrical generator. The electrical generator can supply electrical power to equipment positioned on the sea floor. The electrical power supplied to the equipment positioned on the sea floor can be alternating current and can be substantially free of harmonies associated with electrical power communicated over long distances. The equipment positioned on the sea floor can be selected from the group consisting of an electronic submersible pump, a subsea compressor, a subsea pump, a progressive cavity pump, a heater associated with a flowline extending along the sea floor in order to heat fluids carried within the flowline, and combinations thereof.

The expansion turbine can be a plurality of expansion turbines and the electrical generator can be a plurality of variable speed electrical generators that are each associated with one of the expansion turbines, wherein at least two of which are operating at differing speeds.

In the system, the fuel can be supplied from subsea equipment positioned below the support structure. In the system, the downcomer and boiler section can also have a fuel and air injection tube extending axially there through.

In the system, the support structure can be positioned a predetermined distance away from a production vessel. In the system, the support structure can be tethered to or supported by the sea floor. In the system, the support structure can be a floating structure (such as a moored buoys or anchored vessel), or one that is fixed to the sea floor (such as a fixed or jack-up platform).

In the system, the return passage can be annular and can be located around the boiler portion of the downcomer and boiler section. In the system, the cooling section can convey heat directly to the sea, through forced or natural heat transfer methods. In the system, the cooling section can be closed looped. In the system, the cooling section can convey heat to the air, or to a combination of the air and to the sea.

In the system, the downcomer portion of the downcomer and boiler section can be a single conduit, or a plurality of conduits carrying the liquid from the cooling section. In the systemic the boiler portion of the downcomer and boiler section can be concentric or eccentric to the downcomer portion.

In the system, the support structure can be positioned a predetermined distance away from a host facility.

Another aspect of the invention is a remote power-generation assembly for a subsea system that has an expansion turbine for generating power to supply to subsea equipment. A condenser positioned below sea level that is in fluid communication with the expansion turbine to receive vapor exiting the expansion turbine and to condense the vapor to liquid. A downcomer and boiler assembly having tubular inner and outer conduits that define an outer annulus. The outer annulus is in fluid communication with the condenser to receive the liquid from the condenser. The inner conduit terminates above a closed lower end of the outer conduit so that the interior of the inner conduit is in fluid communication with the outer annulus. The interior of the inner conduit is in fluid communication with an inlet of the expansion turbine. A tubular boiler assembly extends concentrically through the miner conduit to thereby define an inner annulus within the inner conduit. The boiler assembly carries air and fuel through the inner conduit. An igniter is positioned toward a lower end portion of the boiler assembly to ignite the fuel and air, to thereby cause the liquid received by the inner annulus from the outer annulus to boil into vapor for communication to the expansion turbine.

In the remote power-generation assembly, the expansion turbine can be mounted above sea level to a buoyant support structure that is tethered to the sea floor. The condenser section can be completely submerged below sea level. In the remote power-generation assembly, the condenser section can be supported by the support structure.

In the remote power-generation assembly the expansion turbine can drive an electrical generator adapted to supply electrical power to equipment positioned on the sea floor. In the remote power-generation assembly, the electrical generator can produce alternating current or direct current. In the remote power-generation assembly, the electrical generator can produce alternating current that is substantially free of harmonics associated with electrical power communicated over long distances.

In the remote power-generation assembly, the expansion turbine can be a plurality of expansion turbines and the electrical generator can be a plurality of variable speed electrical generators that are each associated with one of the expansion turbines, wherein at least two of which are operating at differing speeds.

The remote power-generation assembly can also include a superheater that is positioned in fluid communication between the inner annulus and the inlet of the expansion turbine in order to add additional heat to the vapor. The remote power-generation assembly can also include a booster turbine and compressor assembly that supplies the air to the boiler assembly. The booster turbine can be driven by vapor led from the inner annulus.

In the remote power-generation assembly, the boiler assembly can have an outer shell and two inner conduits. The two inner conduits can be for carrying the fuel and the air separately before mixing close to the igniter.

In the remote power-generation assembly the exhaust from the ignition of the air and fuel can communicate between the outer shell and the inner conduits. In the remote power-generation assembly, the inner conduit carrying the fuel extends concentrically through the inner conduit carrying the air.

In the remote power-generation assembly conventional variable frequency electrical equipment can also be included to provide variable frequency electrical power from single frequency turbine driven generators to power users.

Another aspect of the invention includes a method for providing power to offshore equipment positioned remote distances from shore and from a production facility. The method includes the step of conveying a liquid down an outer annulus located between an outer conduit and an inner conduit to an inner annulus formed inside of the inner conduit. The liquid in the inner annulus is boiled with a boiler assembly positioned within the inner conduit. Vapor from the boiling liquid is conveyed from the inner conduit to an inlet of an expansion turbine in order to produce power. The expansion turbine is typically located about sea level. Vapor from an outlet of the expansion turbine is conveyed to a cooling section positioned substantially below sea level. The vapor is cooled within the cooling section to form the liquid which is fed into the outer annulus.

In the method, in the step of conveying the vapor from the boiling liquid from the inner conduit to an inlet of the expansion turbine, the expansion turbine can drive an electrical generator to produce electrical power and communicating an electrical current to subsea equipment.

In the method, in the step of conveying the vapor from an outlet of the expansion turbine to a cooling section positioned substantially below the sea level, the cooling section can be a condenser that transfers heat associated with the vapor to the sea.

In the method, the step of conveying the vapor from boiling liquid from the inner conduit to an inlet of the expansion turbine can also include superheating the vapor prior to feeding the vapor to the expansion turbine.

In the method, the step of boiling the liquid in the inner annulus with a boiler assembly positioned within the inner conduit can also include carrying fuel and air through a tubular boiler conduit extending with the inner conduit to an igniter which ignites the fuel and air.

Another aspect of the invention, includes a remote power supply system associated with hydrocarbon production and transportation operations, that has an expansion turbine that generates power for the system. A support structure that is integral with the process components, supports the expansion turbines auxiliary equipment and access facility. The support structure can be tethered to or supported by the sea floor. The remote power supply system also has a cooling section in fluid communication with the expansion turbine to condense to liquid the vapor exiting the turbine. A liquid downcomer is in fluid communication with the cooling section. A boiler section having a feed pre-heater, boiler and superheater is positioned to heat to the liquid received by the downcomer. A combustion air, fuel supply, and exhaust conduit section, having an ignition assembly positioned toward its lower end, ignites a fuel and air mixture, releasing energy to the boiler and causing liquid entering the boiler section to vaporize to a superheated condition.

The basic architecture of the power-generation system or assembly is adaptable to a variety of offshore production concepts. As a stand alone, floating system, the power-generation assembly can be deployed separate from a "Host Facility" or production facility. The power generation assembly will typically include a long, slender, self buoyant "pencil buoy". Positioning and anti-rotation requirements can be accommodated through the site-specific required combination of a multi-point spread mooring system, a tension-riser system, an active (thruster based) positioning system, or a combination thereof.

As stand alone, gravity-based structure, deployed in moderate water depths, the assembly can comprise a long, slender structure supported by appropriate combinations of piles, and/or "mud mats". Additional depth for the system can be provided by submergence below the sea bed as either an integral part of the support oiling system and/or as a structure inserted into a pre-driven support system.

The power-generation assembly can also be capable of integration into a "Host facility" structure. Current marine structures suitable for integration with the power-generation assembly are SPARS, Tension Leg Platforms, Deep Draft Caisson Vessels, and/or dynamically positioned production systems. The power-generation assembly can easily be deployed as part of the mooring system (tension risers, and/or tendons) or as part of the floating structure itself.

Depending upon the power-generation requirements which would dictate the primary condenser duty and the condenser section could comprise of a single smooth concentric chamber, an enhanced surface area concentric chamber, separate multiple condenser chambers with either smooth or enhanced surface areas, or a combination thereof. The surface area of the condenser can also be responsive to the power-generation requirements that dictate the primary condenser duty. Extended surface area could be provided through the use of fins, fluid filled side tubes, a "folded" or convoluted shell structure, or a combination thereof.

Typically sea water will be utilized as the heat sink medium for expansion turbine exhaust vapor condensation which can for example be low pressure steam. However, it may be advantageous in some situations to be replaced with conventional forms of heat exchange equipment providing part or all of the vapor condensation duty. The cooling or condenser section will typically utilize conventionally available heat exchange equipment, including open and closed loop condensing streams, which may ultimately reject heat to process streams, the sea, and/or the air.

For air-cooled heat exchange, the exchanger type can include any combination of natural, forced, and induced draft methods to provide the necessary heat removal. Air-cooled heat exchange navy be advantageous in situations including, but not limited to, shallow water locations because it may be necessary to conserve vertical height for boiler feed-liquid pressure head, locations with limited area available for submerged condenser deployment, or other areas where climactic conditions justify air-cooled heat exchange.

Mooring of the power-generation assemblies can also be closely integrated with production facilities. For example, these assemblies can share control systems communications, utility systems, positioning, mooring, communications fuel storage, fuel supply, chemical storage, chemical distribution, and maintenance access.

Primary Materials of Construction Premise:

As with any system deployed in a marine environment, protection from corrosion and marine growth are primary concerns. It is anticipated that close control of maximum metal temperatures through controlled firing rates, high excess air ratios natural thermosyphon cooling of surfaces in contact with sea water, and the application of suitable, temperature tolerant coatings, claddings and insulation materials are envisioned to allow the use of carbon steel materials for construction. Alternatively, the lower air supply section in the main combustion area may be manufactured from alloy steel with increased temperature resistance properties if desired.

Materials resistant to corrosion and marine growth, such as copper, nickel may, in some cases be economically justified in lieu of conventional coatings to enhance heat transfer flux rates. These materials can be deployed in the form of specialized marine growth-inhibiting applied coatings, thin metal claddings, base metals with the appropriate properties, or combinations thereof.

Fuel Supply (Energy Source) Considerations:

Boilers can be operated on a variety of fuel sources that are typically less suitable or unusable in gas turbines or diesel engines. Such fuels can include refined, modified, and/or unrefined liquid hydrocarbon based fuels, as well as refined, modified, and/or unrefined gaseous hydrocarbon fuels. Supply of these fuels will typically be responsive transfer logistics, system reliability and availability, fuel rate requirements. Proximity to support facilities can factor into the selection of a floating umbilical, a riser based umbilical, an air-transport-to-process, a sea-transport-to process for tethered and/or onboard storage, and combinations thereof. As will be readily appreciated by those skilled in the art, sources of energy can be acceptable alternatives to combustibles, such as chemical reaction derived energy. These may include, but are not limited to, fuel cell, catalytically promoted reaction, fusion and fission based nuclear reaction derived energy, or combinations thereof.

Combustion Air Considerations:

As discussed previously herein, air supply systems can be appropriate responsive to the desired system availability, required power generation rate, desired system operating pressure, and natural, forced, or induced draft combustion. The drivers for induced and forced draft options can include conventional electric motors, turbine drivers deployed in either continuous or intermittent-use modes of operations dependent upon demand. For electrical motor-powered combustion air options, power can be supplied internally, through floating umbilical systems, riser type umbilical systems, or combinations thereof.

Ignition Assembly Considerations:

Multiple ignition sources can be used to ensure reliable boiler assembly start up and operation. Such sources include, but are not limited to, electronic spark, heating coils, flame front generator (similar to flare ignition systems), catalytic ignition, combustion devices, and combinations thereof. Selection of such assemblies can be based upon such considerations as the firing and operating temperatures and power generation rate.

Fluid Considerations:

Because the power-generation assembly is a closed-loop system, loss of the fluid being heated and cooled within should require limited make-up requirements. Feed fluid, typically water, requirements can be determined to satisfy appropriate levels of reliability, availability and intervention intervals. Supply of such feed fluids can be by means of floating umbilical, riser based umbilical, air-transport-to-process and/or sea-transport-to process for tethered and/or on-board storage, or combinations thereof. Conventional heat, chemical, reverse osmosis, and/or permeable membrane water making and purification systems can also be included as part of the power-generation assembly for helping to re-supply feed fluid into the system.

Power Generation Options:

As an expansion turbine, such as a steam turbine, is not limited to single speed operation, pure sine wave power can be produced by controlling the turbine/generator operating speed to directly produce the desired system frequency. Multiple parallel expansion turbine/generator sets can be employed for each driven equipment item where independent motor speeds and/or greater transmission distances are required. This eliminates the need for surface or subsurface employment of delicate and costly electronic variable speed motor controllers.

In instances where the driven equipment can be directly coupled to the enpansion turbine producing the rotating force, the turbine can be controlled to directly produce the desired speed variability.

Electrical power can be generated and distributed at a single voltage/frequency level to single or multiple users through on-board and/or remote distribution hubs such as control modules. Electrical power can be produced at customized voltage and/or fixed or variable frequencies to single or multiple users. Thereby, eliminating the need for expensive and delicate electronic variable speed motor controllers. Such electrical power would have superior performance characteristics to pseudo sine wave power as supplied by electronic variable speed motor controllers. Power generation options may include the inclusion of multiple power generation turbines and electrical generators to provide desired level of system availability.

Advantages Over Rankin Cycle Based System:

A closed cycle, naturally circulated (thermosyphon) boiler system can significantly reduce the space, weight, complexity and cost of a Rankin cycle based power generation system.

Whereas naturally circulated (thermosyphon) heat transfer systems are not uncommon, the unique water depth of an offshore deployment can allow a large vertical architecture, yielding a simple and efficient moderate or high-pressure boiler system without the need for booster and main feed water plumping systems. The elimination of these rotating equipment system components for feed water pressurization greatly simplifies the generation system eliminates their maintenance requirements, and eliminates them as challenges to reliability and availability.

Boilers can be operated on a variety of fuel sources that would be less suitable or unusable in other power generation devices, such as fuel-fired turbines or diesel engines. Given that produced fluids are themselves combustible and in many cases suitable for use as boiler fuel a power generation system, composed of a few highly reliable and available rotating equipment items, using produced fluids as fuel enables the deployment of a power system with no physical contact to a host facility. Thereby, helping to make long distance production tiebacks possible.

DETAILED DESCRIPTION OF THE PREFERRED EMBODIMENT

Figure 1:
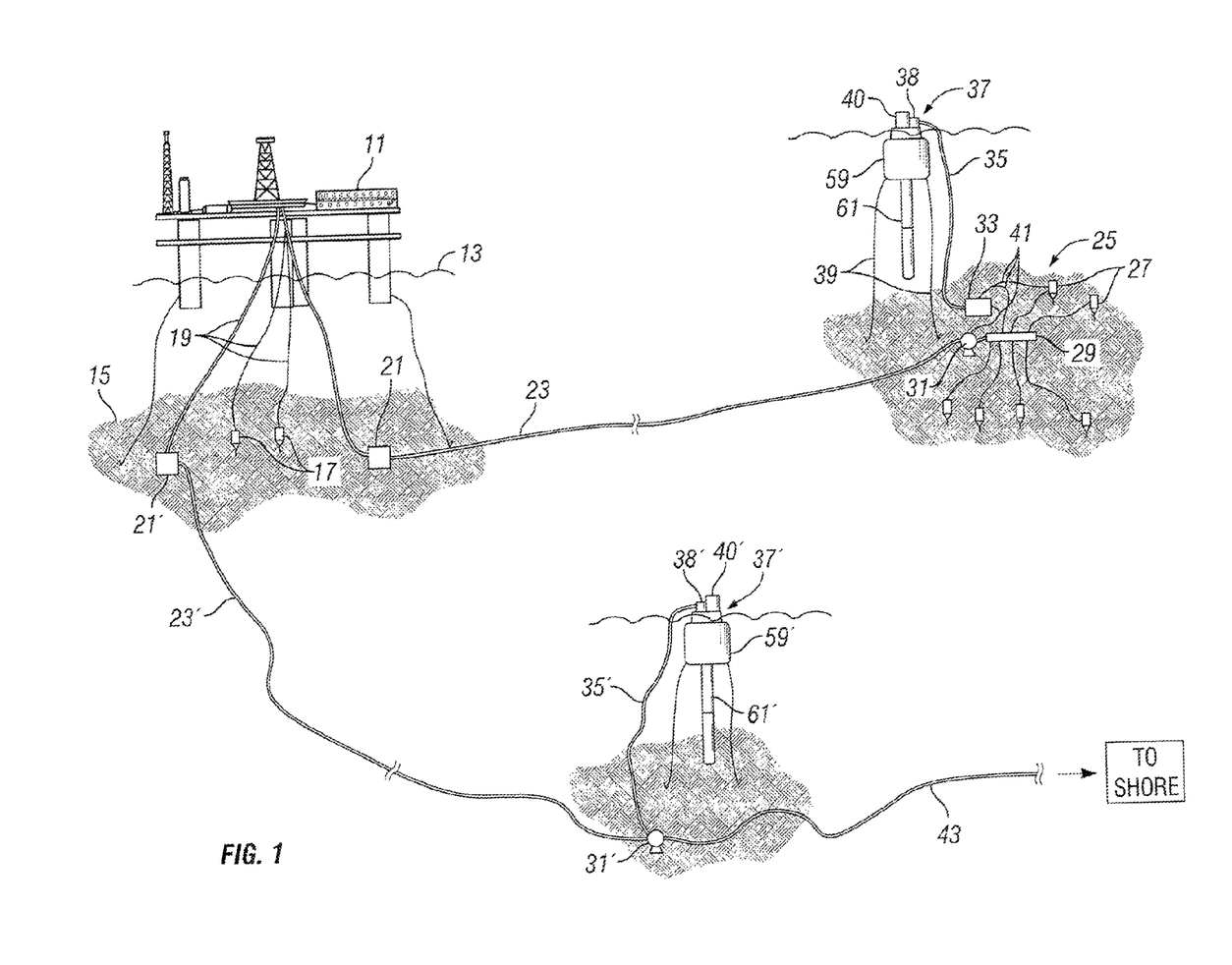
FIG. 1 is an environmental view of a pair of power-generation according to the present invention supplying power to subsea structures that are in communication with a production platform set apart from the power-generation facilities.

Referring to FIG. 1, a production facility 11 is illustrated floating on sea surface 13 above a plurality of well heads 17, located on sea floor 15. While production facility 11 is illustrated in FIG. 1 as a floating platform those skilled in the art will readily appreciate that production facility 11 can alternatively be a floating production storage and uploading (FPFO) vessel, a gravity based structure, or other development-appropriate production facility rather than a floating platform.

A production riser 19 extends between production facility 11 for conveying hydrocarbons from well head 17 to production facility 11 as well for communications and power between production facility 11 and wellhead 17 on sea floor 15. In an embodiment shown in FIG. 1, there are plurality risers 19 extending up to production facility 11 from sea floor 15. One riser 19 extends upward from a pipeline end terminal (PLET) 21 located on seafloor 15, which is in fluid communication with a pipeline 23 carrying hydrocarbons from a remote filed 25.

Remote field 25 is typically located a long distance away, in deep water, or a combination thereof; such that conventional means of supplying power and communications to remote field 25 are difficult and flow assurance issues within pipeline 23 are troublesome. In an embodiment shown in FIG. 1 a plurality of wellheads 27 are located within remote field 25.

In a typical arrangement such as shown in FIG. 1, wellheads 27 are in fluid communication with a subsea manifold 29, positioned on seafloor 15. Subsea manifold 29 collects hydrocarbons from each of wellheads 27 for conveyance to production facility 11 through pipeline 23. In the preferred embodiment, a subsea pump 31 positioned adjacent subsea manifold 29, and receives hydrocarbons from subsea manifold 29 in order to pump hydrocarbons through pipeline 23 to production facility 11.

A control module 33 is preferably positioned on seafloor 15 within remote field 25 for controlling and regulating subsea manifold 29 as well as subsea pump 31. In the preferred embodiment, control module 33 would also regulate and control operations of subsea wellheads 27 within remote field 25. An umbilical 35 preferably extends from subsea control module 33 to a remote power-generation facility 37 that is moored to seafloor 15 via mooring lines 39. In the preferred embodiments, remote power-generation facility 37 is moored with a portion thereof floating above sea surface 13. In a typical arrangement subsea control module 33 also monitors operations of subsea wellhead 27 and communicates operations to productions facility 11 via a communication means. Such communication means can be via radio signal from remote power-generation facility 37 or via fiber optics extending from remote power-generation facility to production facility 11.

In the preferred embodiment, umbilical 35 often communicates electrical power from a generator 38 positioned on remote power-generation facility 37 to control module 33 for distribution amongst subsea well heads 27, subsea manifold 29, and subsea pump 31. Such electrical power drives subsea pump 31 in order to communicate hydrocarbons over the long distances through pipeline 23 to production facility 11. Control lines 41 extend between control module 33 and subsea wellheads 27, manifold 29, and pump 31 in order to communicate electrical signals and power through the subsea devices positioned within remote field 25. An expansion turbine 40, which is also positioned on remote power-generation facility 37 drives generator 38 in order to create the electrical power communicated through umbilical 35 to control module 33, which distributes power to subsea wellhead 27, manifold 29, and subsea pump 31.

Thus far in FIG. 1, we have disclosed an embodiment in which the remote power-generation facility 37 conveys electrical power to a pump 31 positioned on seafloor 15 in order to pump hydrocarbons through pipeline 23 to production facility 11 located a long distance away. In another embodiment, remote power-generation facility 37' can also be utilized for providing electricity to a subsea pump 31' through umbilical 35' in order to act as a booster for pumping hydrocarbons coming from production facility 11 to shore via an additional pipeline 43 extending, from subsea pump 31'. As would be readily appreciated by those skilled in the art, hydrocarbons being communicated through umbilical 19, PLET 21' and pipeline 23' can only travel certain predetermined distances before encountering fluid assurance problems. Having remote power-generation facility 37' positioned between production facility 11 and the shore helps to ensure continuous flow through pipelines 23' & 43 without such flow assurance problems.

As can be seen in FIG. 1, remote power faculty 37' comprises essentially the same components as remote power-generation facility 37 described previously herein. Remote power-generation facility 37' also comprises an expansion turbine 40' driving a generator 38' that produces electrical power for communication to subsea pump 31 pump and/or compressor 31' located on seafloor 15. As would be readily appreciated by those skilled in the art, a plurality of remote power-generation facilities 37' can be intermittently spaced between production facility 11 and the shore to provide multiple booster pump stations in order to ensure proper flow through pipeline 23' & 43. Similarly an additional remote power-generation facility 37 can be positioned between production facility 11 and remote field 25 to provide booster pumping through pipeline 23 in the event that the distance between remote field 25 and production facility 11 requires such additional boosting in order to provide proper flow assurance through pipeline 23.

Figure 2:
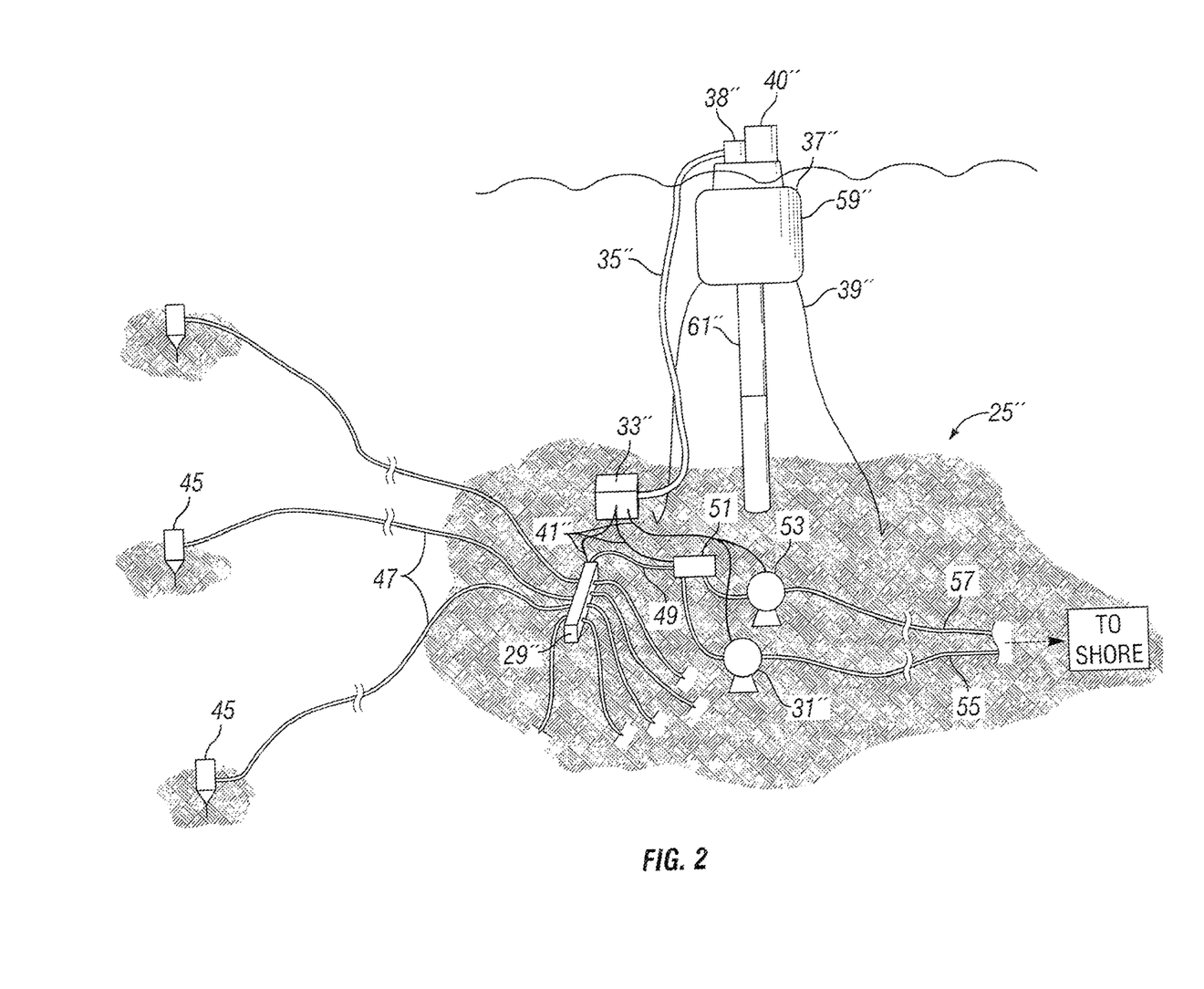
FIG. 2 is an environmental view of a power-generation facility of FIG. 1 positioned above a remote field of subsea wellheads.

Referring now to FIG. 2, in another embodiment, remote power-generation facility 37" is positioned above a remote filed 25" in which hydrocarbons are communicated to shore rather than to production facility 11. Such an arrangement allows for exploration of reserves that previously did not make the deployment of production facility 11 economically feasible because such remote field 25" was located too far away for normal conveyance of hydrocarbons due to power and flow assurance problems.

As shown in FIG. 2, a plurality of wellheads 45 feed hydrocarbons via flow lines 49 into a common subsea manifold 29". Subsea manifold 29" collects hydrocarbons from the plurality of subsea wellheads 45 within remote filed 29" in order to convey the hydrocarbons therefrom more easily. In a preferred embodiment, flowline 49 communicates the hydrocarbons from subsea manifold 29" to a subsea separator 51 positioned adjacent subsea manifold 29". Subsea separator 51 is typically a conventional subsea separator that separates the gaseous elements of hydrocarbons from the liquid elements of hydrocarbons coming into subsea separator 51 from flow line 49. As will be appreciated by those skilled in the art, a deliquidizer could replace or work in conjunction with subsea separator 51, depending on operational requirements.

The gaseous elements coming off of subsea separator 51 are communicated to a subsea compressor 53 while the liquid elements are communicated to subsea pump 31" for communication to the shore via pipelines 55, 57. As would be readily appreciated by those skilled in the art, subsea compressor 33 and subsea pump 31" act upon their respective liquids and gases in order to increase the pressure of the hydrocarbon liquids and gases for communication through flowlines or pipelines 55, 57 to the shore.

As with the previous embodiments, control module 33" communicates electrical power to the subsea equipment located within remote filed 25". Control module 33" provides electrical power to control module 29" subsea separator 51 as well as subsea compressor 53 and subsea pump 31". Such communication can typically be done through control lines 41". Control module 33" preferably receives electrical power and communicates monitoring signals of the subsea equipment via umbilical 35" to remote power-generation facility 37", which also has electrical generator 38" and expansion turbine generator 40".

Remote power-generation facilities 37, 37', 37" are all illustrated as having an upper cooling section or condensor section 59 and a lower downcomer/boiler section 61. In the preferred embodiment downcomer/boiler section 61 extends away from sea surface 13 toward seafloor 15. Condensor section 59 preferably has a majority thereof positioned below sea surface 13. When condensor section 59 is positioned in such a way, the sea helps with heat transfer associated with condensor section 59. Remote power-generation facilities 37, 37', 37" will be discussed in more detail herein below.

Figure 3A:
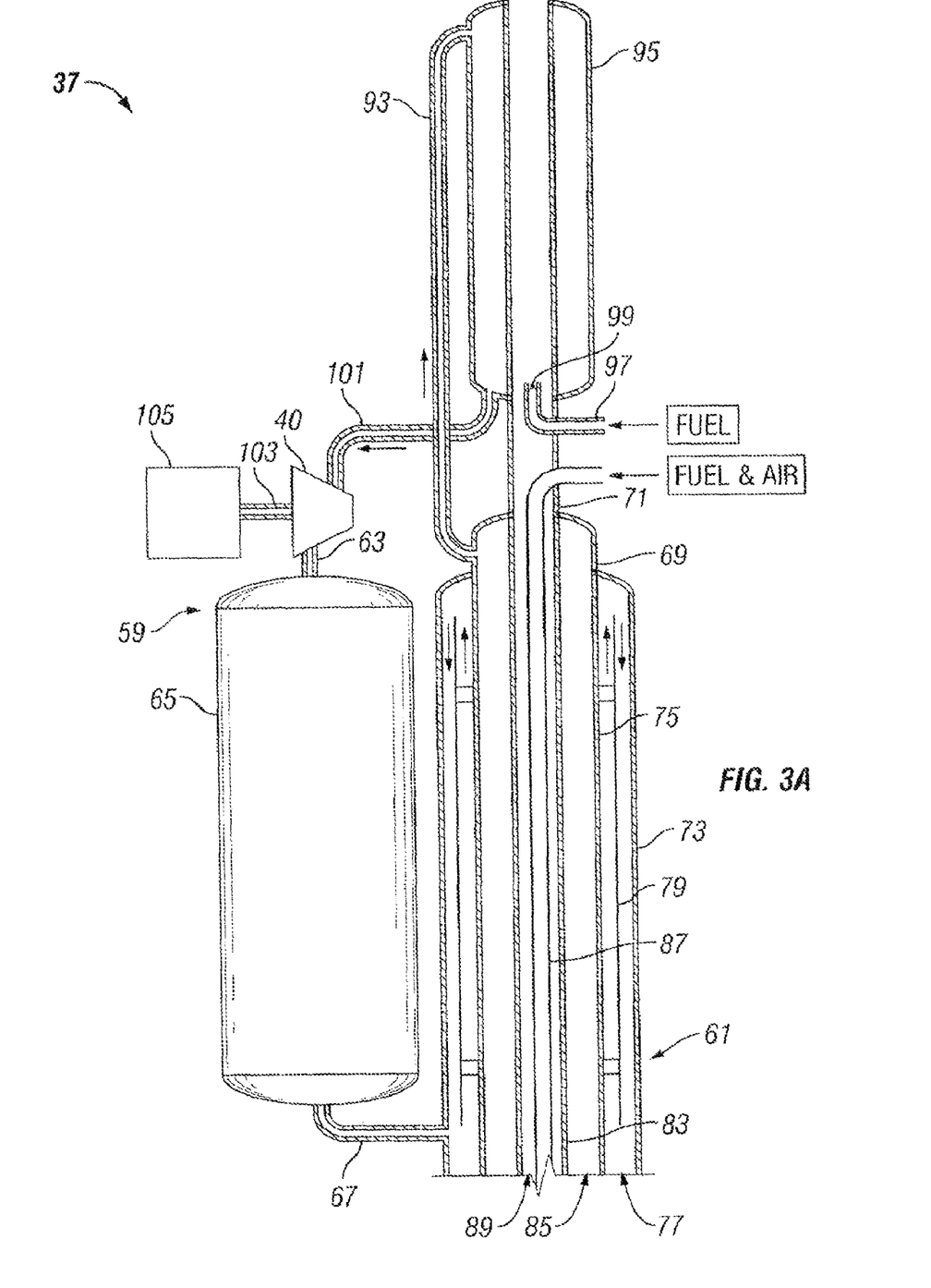
FIGS. 3A & 3B are schematic views of upper and lower portions of the power-generation facilities of FIGS. 1 and 2.
Figure 3B:
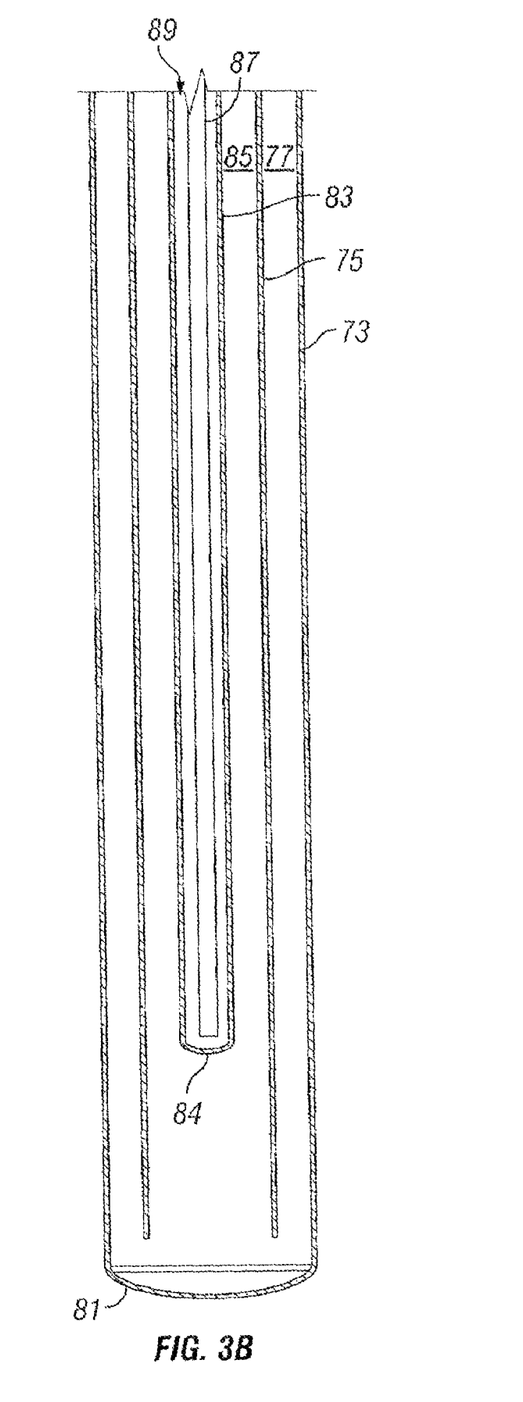

Referring to FIGS. 3A & 3B remote power-generation facility 37 is schematically shown with a turbine exhaust line 63 extending from expansion turbine 40, which carries expansion turbine exhaust vapor exiting expansion turbine 40 to a condenser 65. Condensor 65 is preferably part of cooling or condensor section 59 shown previously in FIGS. 1 & 2. Condensor 65 receives the expansion turbine exhaust vapor from expansion turbine 40 and condenses expansion turbine exhaust vapor to a liquid form therewithin. In the preferred embodiment, heat from the expansion turbine exhaust vapor is communicated through the external walls of condenser 65 to the sea, in which condenser 65 is substantially submerged. In alternative embodiments, cooling section 59 and condersor 65 can transfer heat to the air, or be part of a closed loop system rather than dumping the heat to the air to the sea. A condensor liquid exhaust line 67 extends from condensor 65 in order to carry liquids from condensor 65 to downcomer/boiler section 61.

Downcomer/boiler section 61 preferably includes a downcomer 69 and a boiler assembly 71. Downcomer 69 comprises an outer shell 73, which also defines and outer surface of downcomer/boiler section 61. Outer shell 73 is preferably a tubular structure, such as tubing, or piping which extends coaxially downward within condenser section 59 toward seafloor 15. Condensor liquid exhaust line 67 is preferably in fluid communication with an interior of outer shell 73 so that liquid is communicated through condensor liquid exhaust line 67 from condensor 65 into downcomer 69. Downcomer 69 preferably also comprises of an inner shell 75, which is positioned within outer shell 73. The outer surface of inner shell 75 and the inner surface of outer shell 73 define an outer flow passage or outer annulus 77 which conveys liquids from condensor exhaust lines 67 to a lower portion of downcomer 69.

As will be readily appreciated by those skilled in the art, the liquid coming from condensor liquid exhaust line 67 still may contain gaseous elements therewithin. An inner partition 79 is positioned between inner and outer shell 67 into outer annulus 77, the heavier liquids will flow downward within outer annulus 77 while gaseous elements are allowed to flow upward on a radially interior side of inner partition 79. The gaseous, vapor elements flow upward within the interior portion of inner portion 79 to a closed upper end portion of outer shell 73, and are forced downward along a radially outer side inner partition 79. When traveling downward along inner portion 79, any remaining heat is allowed to transfer through outer shell 73 to cool the remaining vapor elements into liquid form, so that such liquid can condense and commingle with liquid entering downcomer 69 from condensor liquid exhaust line 67.

In the preferred embodiment inner shell 75 terminates toward a lower end portion of downcomer 69 such that outer annulus 77 is in fluid communication with an interior surface of inner shell 75. Liquid flowing within outer annulus 77 is allowed to flow into the interior inner shell 75 as it collects above a closure 81 at the lower end of downcomer 69. As will readily appreciated by those skilled in the art, the liquid levels within outer annulus 77 and within inner shell 75 are going to be a function of the pressures above the liquids within inner shell 75 and outer annulus 77. Any difference in such liquid levels can be defined as the liquid head of the system. Typically, the pressure within inner shell 75 will cause the liquid level within outer annulus 77 to be above the liquid level within inner shell 75 such that the liquid head is defined by the height of the liquid level within outer annulus 77 above the liquid line of the liquid within inner shell 75.

Boiler assembly 71 is preferably positioned within downcomer 69. Boiler assembly 71 preferably includes a boiler outer conduit or shell 83 concentrically positioned within inner shell 75. In the preferred embodiment boiler outer shell 83 extends axially within outer shell 75 as well. In the preferred embodiment, boiler outer shell 83 is a tubular structure having a closed lower end 84 in order to sealing close boiler assembly 71 from fluid communication with downcomer 69. An inner fuel conduit or line 87 preferably extends within boiler outer shell 83 to supply air and fuel from an upper portion of remote power-generation facility 37 to the lower end portion of boiler assembly 71. In the preferred embodiment inner fuel line 87 terminates above close lower end 84 of boiler outer shell 83.

An exterior surface of inner fuel line 87 and the interior surface of boiler outer shell 83 define an exhaust passage or exhaust annulus 89 which carries exhaust from boiler assembly 81 to the atmosphere. An ignition assembly 91 (FIG. 6) is preferably positioned toward a lower end portion of inner fuel line 87 in order to ignite the fuel in air being fed to the lower end portion of boiler assembly 71. The heat from ignited fuel and air causes the liquid within inner shell 75 to boil, and thereby causes vapor to flow upward within downcomer 69 along the interior surface of inner shell 75 and the exterior surface of boiler outer shell 83. The interior surface of inner shell 75 is preferably in fluid communication with expansion turbine 40 such that vapor produced from the heat exerted by the boiler assembly 71 is fed into expansion turbine 40 in order to drive turbine 40.

Exhaust from the ignition of the air and fuel by ignition assembly 91 is carried within exhaust passage 89 to the upper end portion of remote power-generation facility 37 for distribution to the atmosphere. As would be readily appreciated by those skilled in the art, the exhaust can be cleaned or treated with a filter before venting to atmosphere. In the preferred embodiment, fuel supplied to remote power-generation facility 37 is preferably hydrocarbons from pipeline 23, thereby allowing boiler assembly 71 to operate off a readily available fuel source in the remote located of remote power-generation facility 37. However other fuel sources can be used if desired.

In the preferred embodiment, an exhaust vapor line 93 is in fluid communication with inner shell 75 for receiving vapor therefrom, and communicating the vapor from inner shell 75 to a superheater 95 positioned on remote power-generation facility 37. Superheater 95 is preferably a tubular structure positioned circumferentially around exhaust passage 89 such that heat associated with the exhaust flows into superheater 95. Additional fuel can also be supplied through an inlet fuel line 97 into an exhaust passage 89 so that the vapor held within superheater 95 can be supplied with additional heat to increase the temperate and pressure of the vapor to be fed into expansion turbine 40. An additional ignition assembly 99 can be included within inlet fuel line 97 in order to ignite the fuel being fed into exhaust passage 89.

As would be readily appreciated by those skilled in the art, ignition assemblies 91,99 can be a variety of differing assemblies. For example, ignition assemblies 91,99 can be a heating coil, a spark plug, or a catalytic element. The type of ignition assembly for each use is a matter of design preference.

An expansion turbine inlet line 101 conveys the high temperature vapor from superheater 95 to expansion turbine 40. The high pressure, high temperature vapor causes expansion turbine 40 to rotate a drive shaft 103, which in turn drives a piece of driven rotating equipment 105 associated therewith. As would be readily appreciated by those skilled in the art, driven rotated equipment 105 can be selected form numerous types of rotating equipment. For example, driven rotating equipment can be electrical generator 38.

Figure 4:
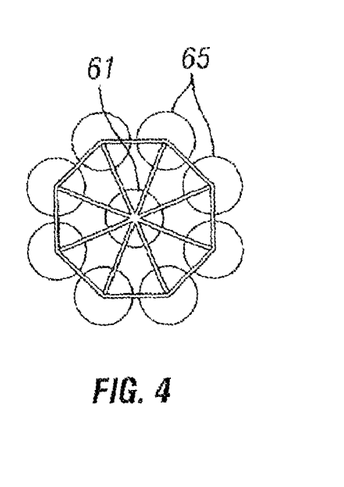
FIG. 4 is a top plan view of a condenser associated with the power-generation facility of FIGS. 3A & 3B.
Figure 5:
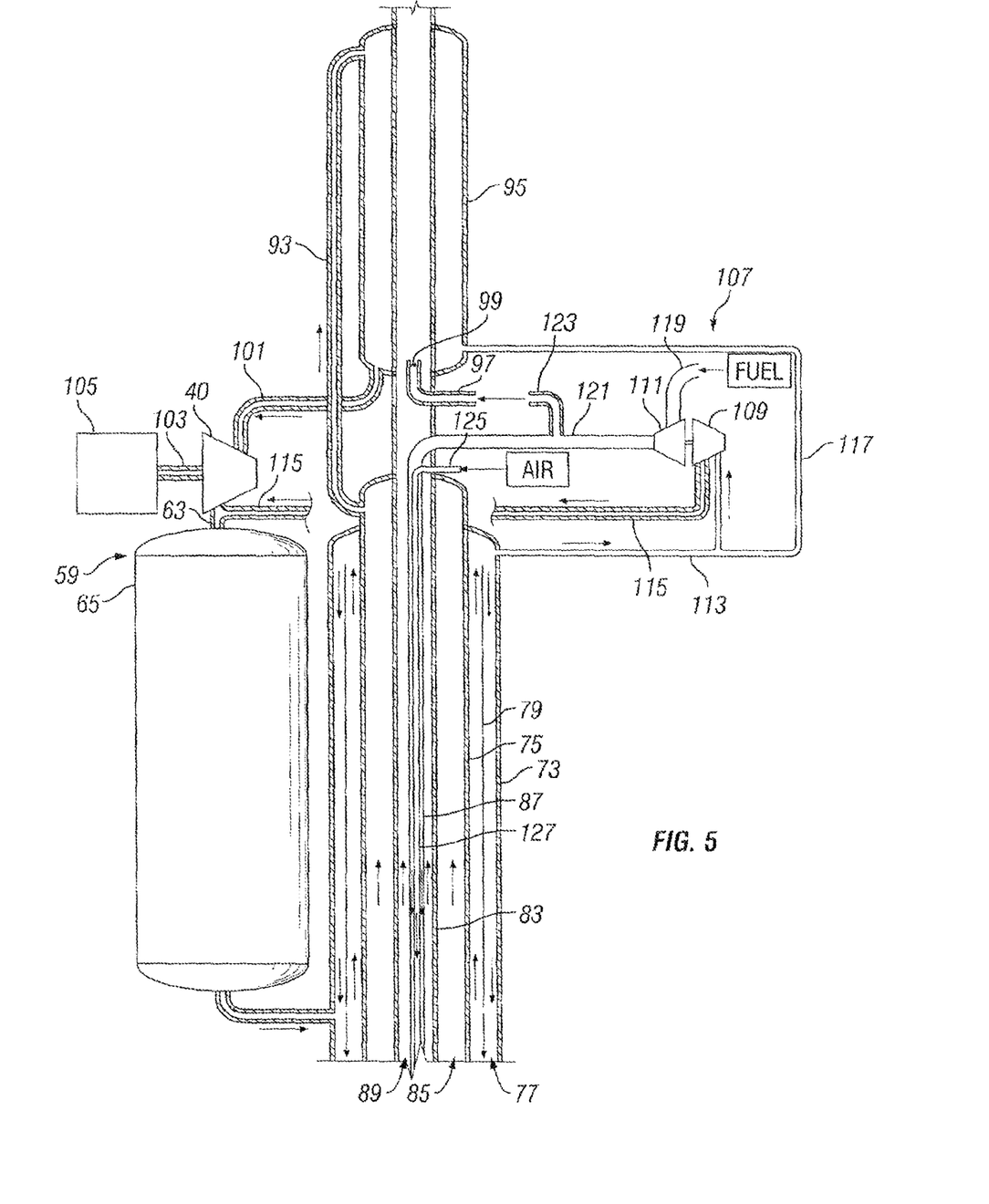
FIG. 5 is a schematic view of an alternative embodiment of an upper portion of the power-generation facility of FIGS. 3A & 3B, which also shows fluid flow paths therewithin.

Referring to FIGS. 4 & 5, condenser 65 is envisioned with several embodiments. One embodiment, such as the one illustrated in FIGS. 4 & 5 has a plurality of small chambers circumferentially spaced around downcomer 69 that are each an individual condenser 65. Each condensor 65 preferably receiving vapor from turbine exhaust line 63 for condensing within each of the plurality of condensers 65. As would be readily appreciated by those skilled in the art, having a plurality of condensers 65 positioned in such art array allow-s for a more efficient transfer of heat from the vapor exiting expansion turbine 40 to the sea.

Figures 7, 8:
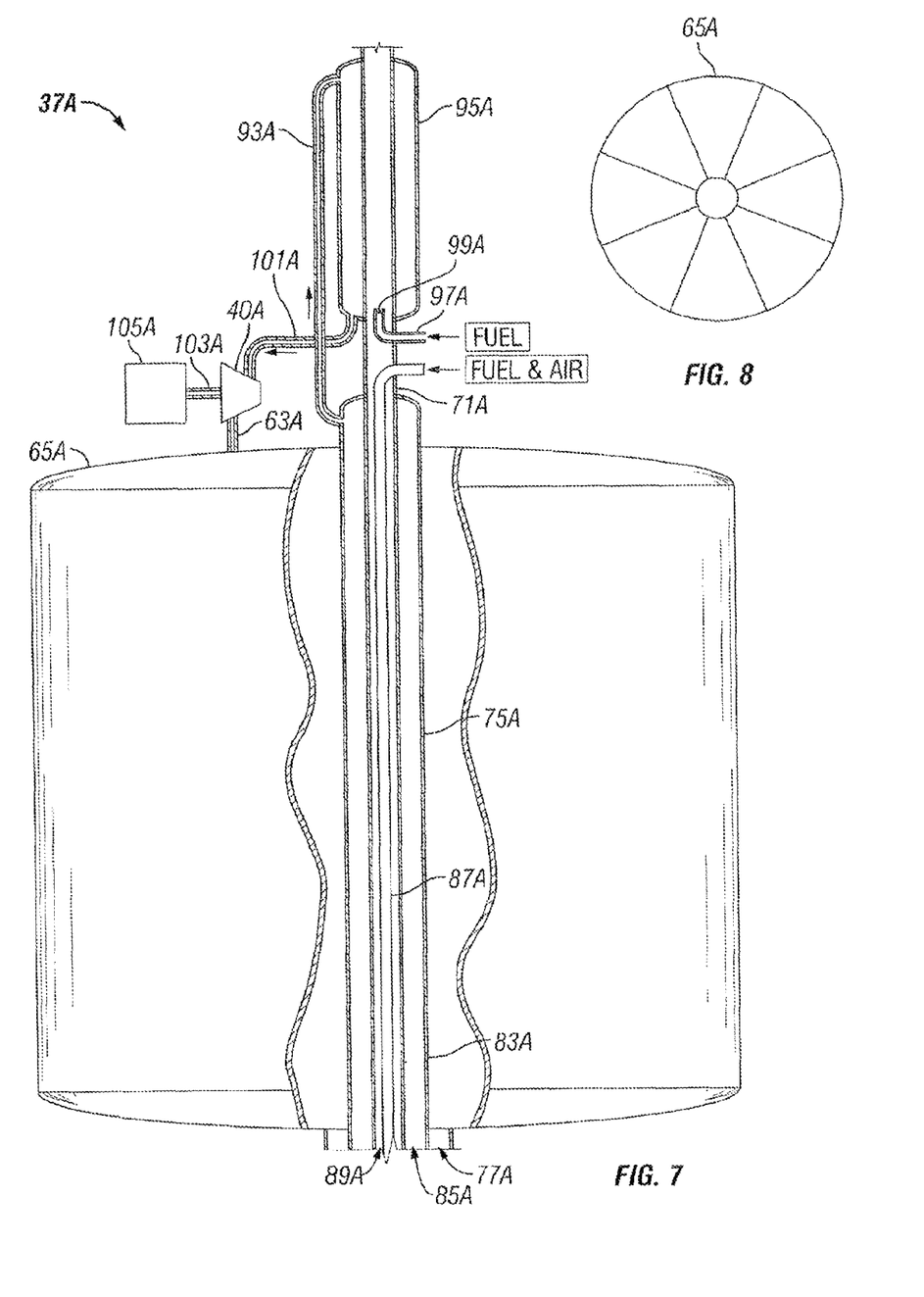
FIG. 7 is a schematic view of an upper portion of the power-generation facility of FIGS. 3A & 3B with an alternative condenser.
FIG. 8 is a top plan view of the condenser associated with the power-generation facility of FIG. 7.

FIGS. 7 & 8 illustrate an alternative embodiment of condensor 65 with one large condenser 65' that encloses around downcomer 69'. As would be readily appreciated by those skilled in the art, condenser 65' has a large surface area that also efficiently transfers heat from the exiting expansion turbine 40' to the sea, in order to more efficiently condense the vapor to liquid form.

Figures 9, 10:
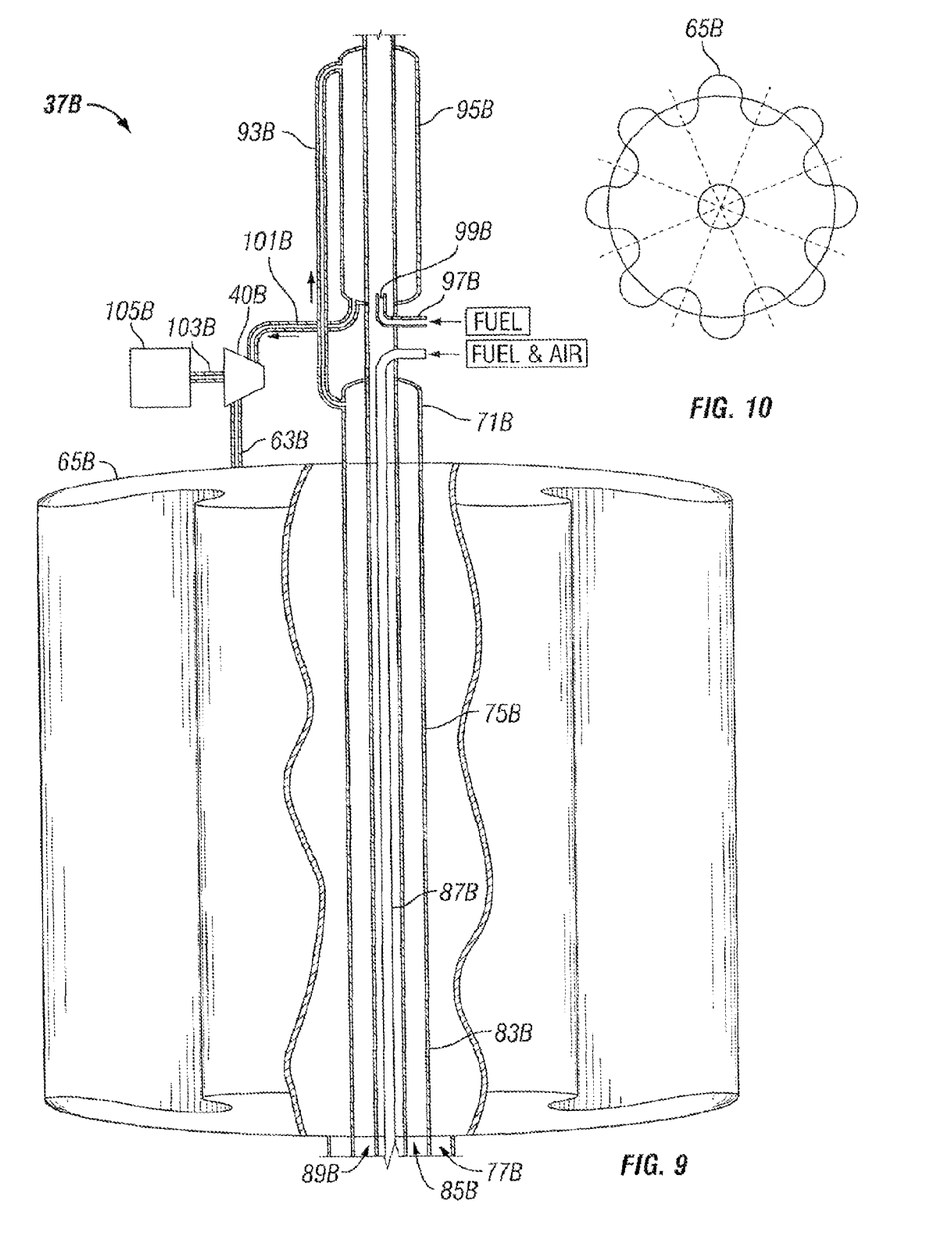
FIG. 9 is a schematic view of an upper portion of the power-generation facility of FIGS. 3A & 3B with another alternative condenser.
FIG. 10 is a top plan view of the condenser associated with the power-generation facility of FIG. 9.

In yet another embodiment of condenser 65, FIGS. 9 & 10 illustrate a large condenser 65" enclosing an upper end portion of downcomer 69" similar to condenser 65' in FIGS. 7 & 8. As is perhaps best shown in FIG. 10 however, condenser 65" has an underlining outer surface that increases the overall effective surface area of condensor 65" for more efficient heat transfer from within condenser 65" to the sea.

Figure 6:
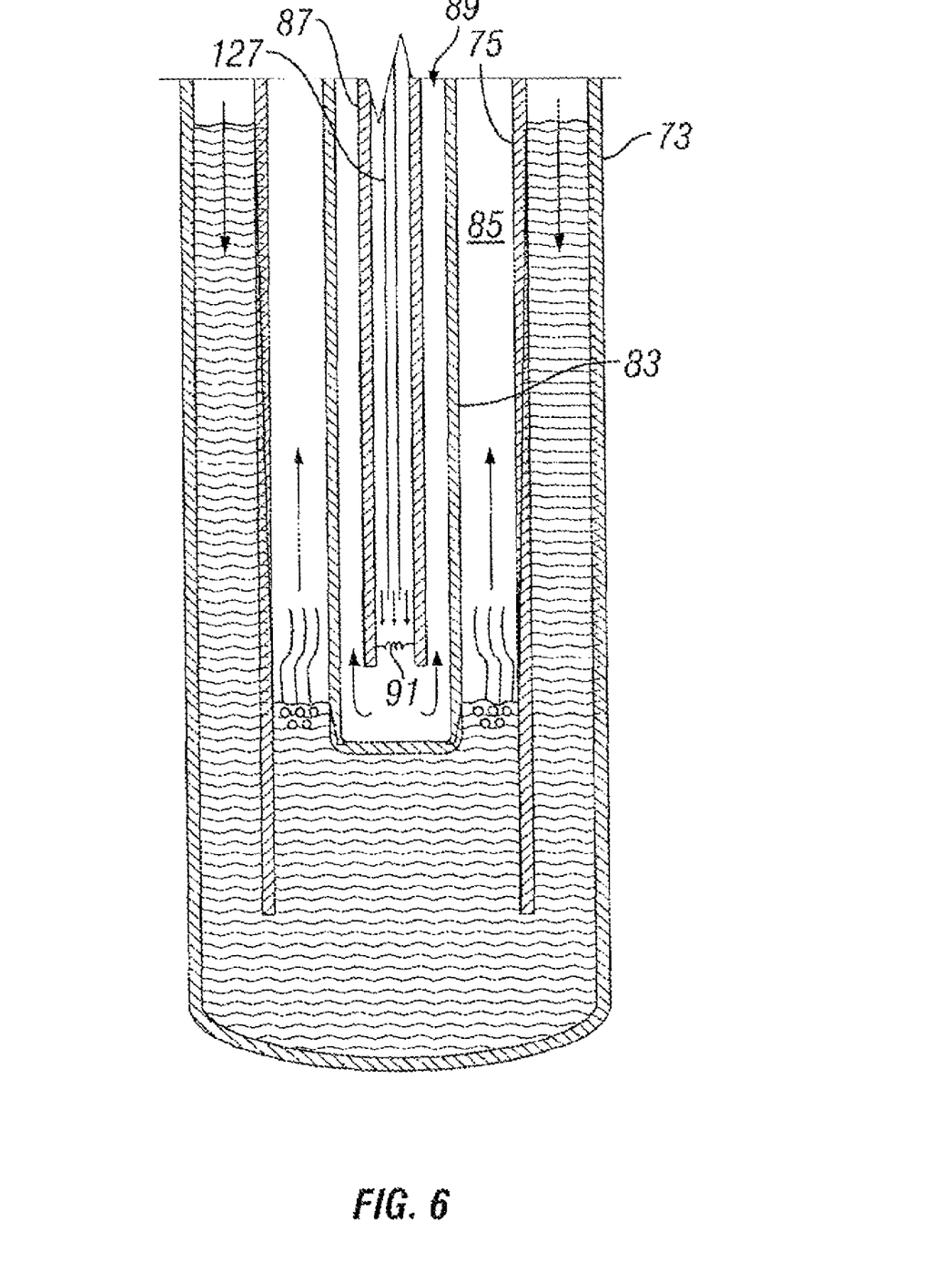
FIG. 6 is a schematic view of an alternative embodiment of a lower of the power-generation facility of FIGS. 3A & 3B.

Referring to FIGS. 5 & 6, the internals of downcomer/boiler section 61 are shown in more detail, as well as illustrating an alternative embodiment having a fuel conditioning assembly 107 present on remote power-generation facility 37. Fuel conditioning assembly 107 preferably includes an expansion turbine 109 driving a compressor 111, which compresses the fuel being fed into boiler assembly 71. In the preferred embodiment a vapor feed line 113 extends off of inner shell 75 to supply feed vapor to expansion turbine 109, while an exhaust line 115 extends from an exhaust of expansion turbine 109 to turbine exhaust line 63 for feeding into condensor 65. Excess vapor from vapor feed line 113 extends through an excess feed line 117 to superheater 95 to be reheated along with the rest of the vapor entering superheater 95 through exhaust vapor line 93.

The fuel inlet line 119 supplies hydrocarbons from the fuel source to compressor 111 in order to increase the pressure of the fuel being fed into boiler assembly 71. A fuel exhaust line 121 communicates the high pressure fuel from compressor 111 to inner fuel line 87. A fuel line exhaust bypass 123 also supplies high pressure fuel to inlet fuel line 97 for supplying heat to superheater 95.

In the embodiment shown in FIGS. 5 & 6, an air inlet line 125 conveys air to the lower end portion of lower assembly 71, via an air inlet conduit or line 127, without mixing the air and fuel until just prior to reaching ignition assembly 91. Air inlet line 127 preferably extends concentrically within inner fuel line 87 to just above ignition assembly 91, such that the air and fuel mix just prior to ignition by ignition assembly 91.

In operation, vapor generated by the boiling of the liquid within inner shell 75 by boiler assembly 71 supplies the power to drive expansion turbine 40, which in turn drives driven rotating equipment 105 such as generator 38. The exhaust vapor from expansion turbine 40 exits through turbine exhaust line 63, and is condensed within condenser section 59 of remote power-generation facility 37. Condensors 65,65',65" transfer heat from the exhaust so that it becomes liquid for conveyance into downcomer/boiler section 61. Condensor liquid exhaust line 67 communicates the liquid from condensor section 59 to outer flow passage 77 within outer shell 73 and inner shell 75. Any remaining vapor carried within the liquid is allowed to cool by circulating around inner partition 79, in which the cooled vapor transforms into liquid and joins the other liquid already being conveyed down outer flow passage 77 toward the lower end portion of downcomer 69. As the liquid accumulates at and above closure 81, and starts to flow upward within inner shell 75, a fluid head is created within outer flow passage 77 due to the differential pressures within inner shell 75 and outer flow passage 77.

Fuel is supplied through inner fuel line 87 to a lower end portion of boiler assembly 71 situated within inner shell 75 in order to heat the liquid accumulating within inner shell 75 to boil. Vapor generated from such boiling is carried within inner shell 75 for communication to expansion turbine 40. If desired, exhaust vapor line 93 can carry the vapor generated by boiler assembly 71 directly to an inlet of expansion turbine 40, or indirectly to expansion turbine 40 via superheater 95 for reheating the vapor. If superheater 95 is utilized, fuel is supplied through inlet fuel line 97 for reheating the vapor within superheater 95 prior to supplying the vapor to expansion turbine 40.

The exhaust from the ignition of the fuel from inner fuel line 87 is conveyed through exhaust passage 89 extending along an outer surface of inner fuel line 87. As would be readily appreciated by those skilled in the art, heat is allowed to be transferred from exhaust passage 89 to inner shell 75 throughout the entire length of inner shell 75. Any remaining hydrocarbons that were not ignited by ignition assembly 91 can further be intimated by ignition assembly 99 with the additional fuel being fed into exhaust passage 89 by inlet fuel line 97 when superheating the vapor with superheater 95.

When driven rotating equipment 105 is electrical generator 38, generator 38 supplies electrical power to subsea equipment such as subsea control module 33, subsea well head 27, subsea manifold 29, subsea pump 31, subsea compressor 53, and subsea separator 51.

The liquid described as flowing through expansion turbine 40, condenser section 59, and downcomer/boiler section 61 is preferably water. However, as would be readily appreciated by those skilled in the art, the liquid can be numerous other types of fluid. Remote power-generation facility 37 can also have a plurality of expansion turbines 40 situated thereon, which can each in turn drive various pieces of rotating equipment 105 as well as a plurality of generators 38. Having such a plurality of expansion turbines 40 allows for generators 38 to be driven at various speeds, and thereby being able to supply power at various frequencies, or simply having a plurality of generators 38 operating at common frequency for creating more power though a plurality of generators 38 acting in parallel.

While the invention has been shown in only some of its forms, it should be apparent to those skilled in the art that it is not so limited, but susceptible to various changes without departing from the scope of the invention. For example, remote power-generation facility 37 can be secured to sea floor 15 in more shallow waters rather than being a floating structure that is moored. Moreover, though not illustrated, it is also contemplated that downcomer/boiler section 61 could undulate rather than just extending downward. As will be readily appreciated by those skilled in the art, such undulations could be used to creating stages for increasing the pressure of the vapor upon each undulation. Moreover, using such undulations would lessen the actual height/length required for such downcomer/boiler section 61 (e.g., the depth it extends downward into the water), while maintaining a similar effective length that is the total displacement of the vapor through downcomer/boiler section 61.

That claimed is:

1. A remote power supply system associated with offshore hydrocarbon production and transportation operations, comprising an expansion turbine that generates power for the system; a support structure that supports the expansion turbine; a cooling section supported by the support structure and being in fluid communication with the expansion turbine to receive the vapor therefrom and to condense to liquid the vapor exiting the expansion turbine; a downcomer and boiler section comprising tubular inner and outer conduits thereby defining an outer annulus, the outer annulus being in fluid communication with the condenser to receive the liquid from the condenser, the inner conduit terminating above a closed lower end of the outer conduit so that the interior of the inner conduit is in fluid communication with the outer annulus, the interior of the inner conduit being in fluid communication with an inlet of the expansion turbine; a tubular boiler section extending concentrically through the inner conduit to thereby define an inner annulus within the inner conduit, the boiler section carrying air and fuel through the inner conduit; an ignition assembly positioned toward a lower end portion of the downcomer and boiler section that ignites a fuel and air mixture and causes the liquid received by the downcomer and boiler section from the cooling section to boil into vapor; and a return passage in fluid communication with an inlet of the expansion turbine that conveys vapor from the downcomer and boiler section to the inlet of the expansion turbine.

2. The system according to claim 1, wherein the cooling section comprises a condenser.

3. The system according to claim 2, wherein the condenser is submerged below sea level.

4. The system according to claim 1, wherein the downcomer and boiler section extends from within the cooling section toward the sea floor.

5. The system according to claim 1, wherein: the expansion turbine drives an electrical generator to supply electrical power to equipment positioned on the sea floor.

6. The system according to claim 5, wherein the equipment positioned on the sea floor is selected from the group consisting of an electronic submersible pump, a subsea compressor, a subsea pump, a progressive cavity pump, a heater associated with a flowline extending along the sea floor in order to heat fluids carried within the flowline, and combinations thereof.

7. The system according to claim 5, wherein: the electrical power is substantially free of harmonics associated with electrical power communicated over long distances; and the expansion turbine comprises a plurality of expansion turbines and the electrical generator comprises a plurality of variable speed electrical generators that are each associated with one of the expansion turbines, wherein at least two of which are operating at differing speeds.

8. The system according to claim 1, wherein the fuel is supplied from subsea equipment positioned below the support structure.

9. The system according to claim 1, wherein the downcomer and boiler section further comprises a fuel and air injection tube extending axially therethrough.

10. The system according to claim 1, wherein the support structure is positioned a predetermined distance away from a production vessel.

11. A remote power-generation assembly for a subsea system, comprising
an expansion turbine for generating power to supply to subsea equipment;
a condenser positioned below sea level, the condenser being in fluid communication with the expansion turbine to receive vapor exiting the expansion turbine and to condense the vapor to liquid;
a downcomer and boiler assembly comprising tubular inner and outer conduits thereby defining an outer annulus, the outer annulus being in fluid communication with the condenser to receive the liquid from the condenser, the inner conduit terminating above a closed lower end of the outer conduit so that the interior of the inner conduit is in fluid communication with the outer annulus, the interior of the inner conduit being in fluid communication with an inlet of the expansion turbine;
a tubular boiler assembly extending concentrically through the inner conduit to thereby define an inner annulus within the inner conduit, the boiler assembly carrying air and fuel through the inner conduit; and
an igniter positioned toward a lower end portion of the boiler assembly to ignite the fuel and air and to cause the liquid received by the inner annulus from the outer annulus to boil into vapor for communication to the expansion turbine.

12. The remote power-generation assembly according to claim 11, wherein the expansion turbine is mounted above sea level to a buoyant support structure that is tethered to the sea floor and the condenser section is submerged below sea level.

13. The remote power-generation assembly according to claim 11, wherein the condenser is submerged below sea level.

14. The remote power-generation assembly according to claim 11, wherein:
the expansion turbine drives an electrical generator adapted to supply electrical power to equipment positioned on the sea floor.

15. The remote power-generation assembly according to claim 14, wherein:
the electrical generator produces alternating current that is substantially free of harmonics associated with electrical power communicated over long distances; and
wherein the turbine comprises a plurality of expansion turbines and the electrical generator comprises a plurality of variable speed electrical generators that are each associated with one of the expansion turbines, wherein at least two of which are operating at differing speeds.

16. The remote power-generation assembly according to claim 11, further comprising a superheater positioned in fluid communication between the inner annulus and the inlet of the expansion turbine in order to add additional heat to the vapor.

17. The remote power-generation assembly according to claim 11, further comprising a booster turbine and compressor assembly that supplies the air to the boiler assembly.

18. The remote power-generation assembly according to claim 11, wherein the booster turbine is driven by vapor fed from the inner annulus.

19. The remote power-generation assembly according to claim 11, wherein the boiler assembly comprises an outer shell and two inner conduits, the two inner conduits carrying the fuel and the air separately before mixing close to the igniter.

20. The remote power-generation assembly according to claim 19, wherein the inner conduit carrying the fuel extends concentrically through the inner conduit carrying the air.

21. A method for providing power to offshore equipment positioned remote distances from shore and from a production facility, comprising
(a) conveying a liquid down an outer annulus located between an outer conduit and an inner conduit to an inner annulus formed inside of the inner conduit;
(b) boiling the liquid in the inner annulus with a boiler assembly positioned within the inner conduit;

(c) conveying vapor from the boiling liquid from the inner conduit to an inlet of a expansion turbine above sea level in order to produce power;

(d) conveying vapor from an outlet of the expansion turbine to a cooling section positioned substantially below sea level; and (e) cooling the vapor within the cooling section to form the liquid which is fed into the outer annulus.

22. The method according to claim 21, wherein in step (c), the expansion turbine drives an electrical generator to produce electrical power and communicating an electrical current to subsea equipment.

23. The method according to claim 21, wherein in step (d), the cooling section comprises a condenser that transfers heat associated with the vapor to the sea.

24. The method according to claim 21, wherein step (c) further comprises superheating the vapor prior to feeding the vapor to the expansion turbine.

25. The method according to claim 21, wherein step (b) further comprises carrying fuel and air through a tubular boiler conduit extending with the inner conduit to an igniter which ignites the fuel and air.

* * * * *